United States Patent [19]

Fujiwara et al.

[11] 4,260,356
[45] Apr. 7, 1981

[54] PLASTIC DISPENSING APPARATUS

[75] Inventors: Tatsuo Fujiwara, Komaki; Masayasu Watanabe, Sendai; Mikio Yabumoyo, Inuyama; Takaaki Kanemori, Komaki; Hiroshi Seo, Hatofukidai, all of Japan

[73] Assignee: Toyo Seikan Kaisha, Ltd., Tokyo, Japan

[21] Appl. No.: 127,416

[22] Filed: Mar. 5, 1980

[30] Foreign Application Priority Data

Mar. 8, 1979 [JP] Japan .................. 54-26197

[51] Int. Cl.³ .......................... B29C 17/14
[52] U.S. Cl. .................... 425/311; 264/142
[58] Field of Search .................. 425/311; 264/142

[56] References Cited

U.S. PATENT DOCUMENTS

| | | | |
|---|---|---|---|
| 3,025,564 | 3/1962 | Voigt | 264/142 |
| 3,360,827 | 1/1968 | Aichele | 425/311 |
| 3,892,834 | 7/1975 | Pritchard | 264/142 |
| 4,060,053 | 11/1977 | Ohmi | 425/311 |

*Primary Examiner*—Donald E. Czaja
*Assistant Examiner*—James R. Hall
*Attorney, Agent, or Firm*—Pennie & Edmonds

[57] ABSTRACT

A plastic resin cutting apparatus for cutting a plastic extruded from an extrusion opening provided in a flat surface of an extrusion block. The apparatus comprises a rotating shaft disposed substantially perpendicular to the surface of the extrusion block with its front end positioned opposite to said surface; a drive mechanism for rotating the rotating shaft; and a cutting tool interposed between the surface of the extrusion block and the front end of the rotating shaft and having formed at its front surface facing the surface of the extrusion block at least one cutting blade having a flat cutting edge. At least the front end portion of the rotating shaft is urged resiliently toward the surface of said extrusion block by the action of an elastic member such as a spring. The connection of the cutting tool to the shaft is a universal connection. Thus, the cutting tool can tilt in any desired direction with respect to the axis of rotation of the rotating shaft and thereby maintain the cutting edge of the blade flat against the flat surface of the extrusion block. The rotating shaft has mounted thereon at least one drive pin which projects forward and comes into engagement with the cutting tool. The rotation of the rotating shaft is transmitted to the cutting tool through the drive pin.

14 Claims, 6 Drawing Figures

PLASTIC DISPENSING APPARATUS

TECHNICAL FIELD

This invention relates to a plastic dispensing and cutting apparatus, and more specifically, to a plastic dispensing and cutting apparatus for cutting a plastic extruded from an extrusion opening provided in a flat surface of an extrusion block disposed at the front end of an extruder by means of a cutting blade moving across the opening.

BACKGROUND ART

In the formation of plastic sealing liners in the shells of container closures of various types such as crown caps or screw caps, it is a general practice to cut charges of plastic as it is extruded from an extruder and to dispense the individual charges into successive shells as they pass in single file below the extruder. Devices of this type are disclosed, for example, in U.S. Pat. Nos. 3,360,827 and 4,060,053. In construction, the extruder of these devices includes an extrusion block disposed at the front end of the extruder and having a flat surface through which an extrusion opening extends. By the action of a cutting blade rotating across the opening end of the extrusion opening, dispensing of the cut charge of the plastic to a predetermined position within a shell is effected. The filled shell is then carried to a location where the plastic in the shell is molded into the desired shape.

A conventional cutting and dispensing device includes a rotating shaft extending substantially perpendicular to the flat surface of the extrusion block with its front end positioned opposite to the flat surface of the block. At the front end of this shaft, a cutting tool is mounted such that a cutting blade formed on the front surface of the tool is rotated across the open end of the extrusion opening. The cutting tool is mounted on the front end of the rotating shaft by a connection at the back surface of the cutting tool with the shaft extending substantially perpendicular to the flat surface of the extrusion block. Spring means are employed by urging the shaft and thus the cutting tool and blade against the flat surface of the extrusion block. Accordingly, the cutting blade formed on the front surface of the cutting tool is brought into resilient contact with the flat surface of the extrusion block by the action of the spring, and is rotated across the open end of the extrusion opening by rotational action transmitted to the cutting tool by the rotating shaft.

In order to properly cut the plastic extruded from the extrusion opening in this type of apparatus and to properly dispense a predetermined amount of the cut plastic to a predetermined position within a shell, it is important that the entire flat cutting edge of the cutting blade make linear contact with the flat surface of the extrusion block. Otherwise, the resin will not be cut well and the time required for cutting will become somewhat longer and cause errors in the amount and position of the plastic dispensed into the shell. In particular, when the cutting blade is rotated at high speed and the cutting and dispensing of the plastic by means of the cutting blade are carried out at high speed, any increase in the time required for cutting the resin by the cutting blade would cause considerable errors in the amount and position of the resin dispensed to the shell.

In order to bring the entire flat cutting edge of the cutting blade into linear contact with the flat surface of the extrusion block, it is necessary in principle to dispose the rotating shaft fully perpendicular to the flat surface of the extrusion block, form the connection on the back surface of the cutting tool perpendicular to the cutting edge on the front surface of the cutting tool, and to also mount the cutting tool on the front end of the rotating shaft with its cutting edge precisely perpendicular to the axis of rotation of the rotating shaft. As can be readily appreciated, it is extremely difficult, it not sometimes impossible, to meet all of these requirements. Accordingly, in the conventional plastic cutting apparatus, the entire flat cutting edge of the cutting blade does not generally make sufficiently, good linear contact with the flat surface of the extrusion block, and this frequently causes errors in the amount and position of the resin dispensed to shells. Moreover, because the cutting blade does not make contact with the surface of the extrusion block as prescribed, the cutting blade undergoes localized wear, and its life is relatively short.

In some conventional plastic cutting apparatus, the cutting tool is mounted such that it may tilt in a predetermined direction with respect to the front end of the rotating shaft at its connection to the rotating shaft. In such a structure, the error in the mounting of the rotating shaft, the error in the connection between the shaft and cutting tool, etc. can be partially corrected by this tilting. The errors, however, can be corrected only in a very limited region in a predetermined direction in which the tool can tilt. The aforesaid problem, therefore, remains essentially unsolved. If the cutting tool were mounted such that it could tilt in any direction with respect to the front end of the rotating shaft, the aforesaid errors would be able to be fully corrected. But in conventional apparatus, the direction of tilting of the cutting tool with respect to the rotating shaft is necessarily limited to a predetermined one because the rotation of the rotating shaft must be transmitted to the mounting base through its connection to the cutting tool. Consequently, it is impossible with present constructions to make the cutting tool tilt in any desired direction with respect to the front end of the rotating shaft.

In addition to the above problem, in the conventional plastic cutting apparatus, a mounting base for connection of the cutting tool to the rotating shaft must extend substantially perpendicularly to the cutting blade and along the axis of rotation of the rotating shaft. Thus, it must be formed precisely on the back surface of the cutting tool whose front surface has a flat cutting edge formed therein. This naturally leads to an increased cost of production of the cutting tool.

DISCLOSURE OF THE INVENTION

In accordance with the teachings of the present invention an excellent plastic cutting apparatus is provided in which the entire flat cutting edge of the cutting blade can be brought into very good linear contact with the flat surface of the extrusion block irrespective of some errors in the mounting or manufacture of the rotating shaft, etc. thus obviating the aforesaid problems with the conventional plastic cutting apparatus.

Generally the apparatus of the present invention includes a cutting tool with a cutting blade having at least one cutting edge disposed in a flat plane. The cutting tool is connected to the front end of a rotable shaft at the back surface of the tool. The connection is made for universal pivoting movement of the tool with respect to the shaft so as to hold the cutting edge of the cutting blade flat against the flat surface of the extrusion blade. Finally, a drive means is connected between the rotatable shaft and the cutting tool to effect rotation of the cutting tool upon rotation of the shaft. This, in turn, effects movement of the cutting blade across the extrusion opening with the cutting edge lying flat against the flat surface of the extrusion block.

In the plastic dispensing and cutting apparatus of this invention, the transmission of the rotation of the rotating shaft to the cutting tool is performed not through the front end of the rotating shaft which abuts the rotating center of the back surface of the cutting tool and presses the cutting tool resiliently against the surface of the exit block, but through at least one drive pin which is mounted separately on the rotating shaft. The pin projects forwardly and comes into engagement with the cutting tool at a location radially spaced from the point of connection of the rotating shaft. Accordingly, the cutting tool can be tilted in any direction with respect to the front end of the rotating shaft without any inconveniences. Thus, if the surface of the extrusion block and the cutting edge of the cutting tool are sufficiently flat, some errors in the manufacture and installation of the rotating shaft, etc. which may exist can be corrected by the tilting of the cutting tool in a desired direction. Consequently, the entire cutting edge of the cutting blade can be brought into very good linear contact with the surface of the extrusion block. Furthermore, since it is not necessary to form a mounting base in the back surface of the cutting tool extending precisely perpendicular to the cutting blade and along the axis of rotation of the rotatable shaft, the cutting tool can be produced easily at low cost.

DETAILED DESCRIPTION OF THE INVENTION

Figure 1:
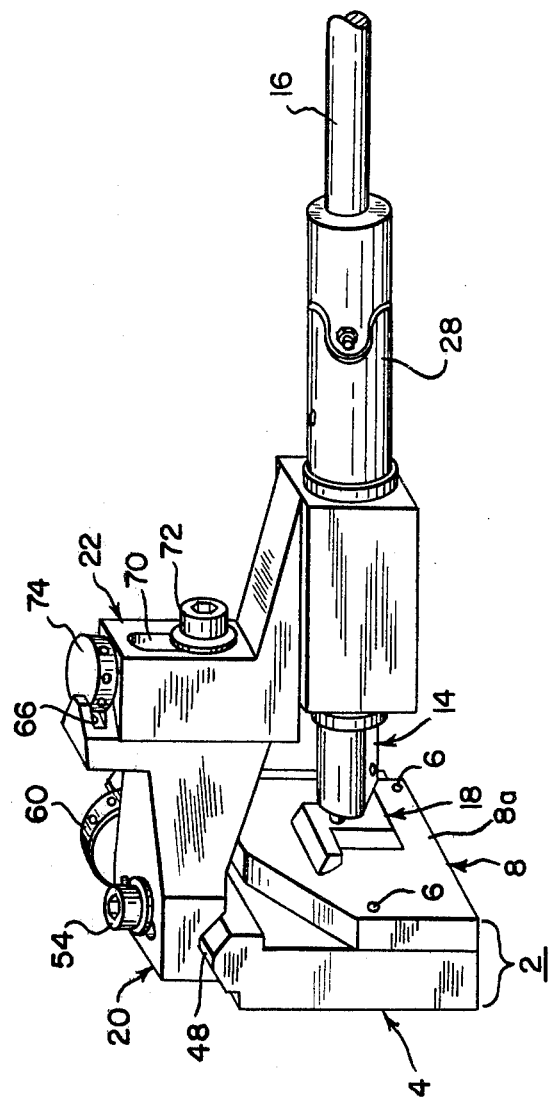
FIG. 1 is a perspective view of one embodiment of the plastic dispensing and cutting apparatus of this invention.
Figure 2:
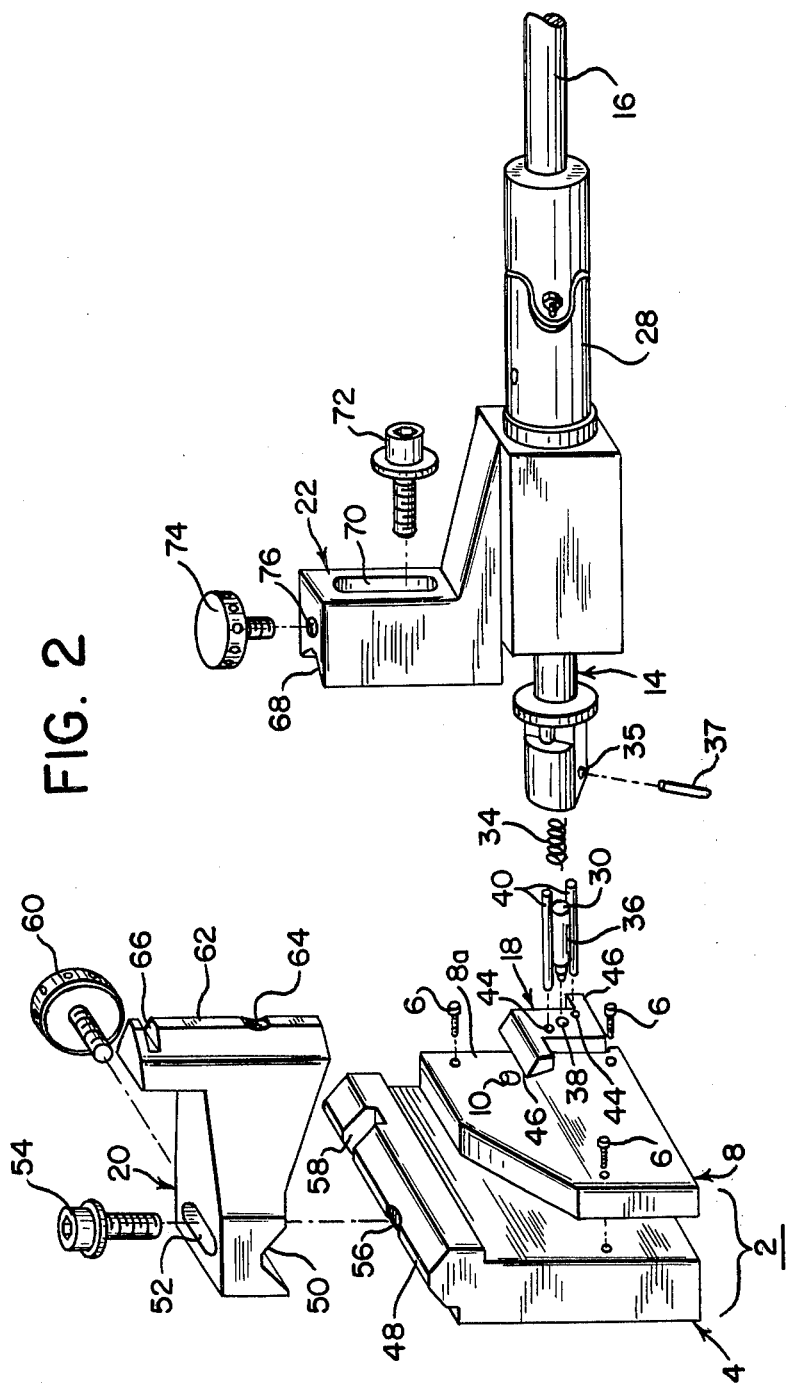
FIG. 2 is an exploded view of the apparatus shown in FIG. 1.
Figure 3:
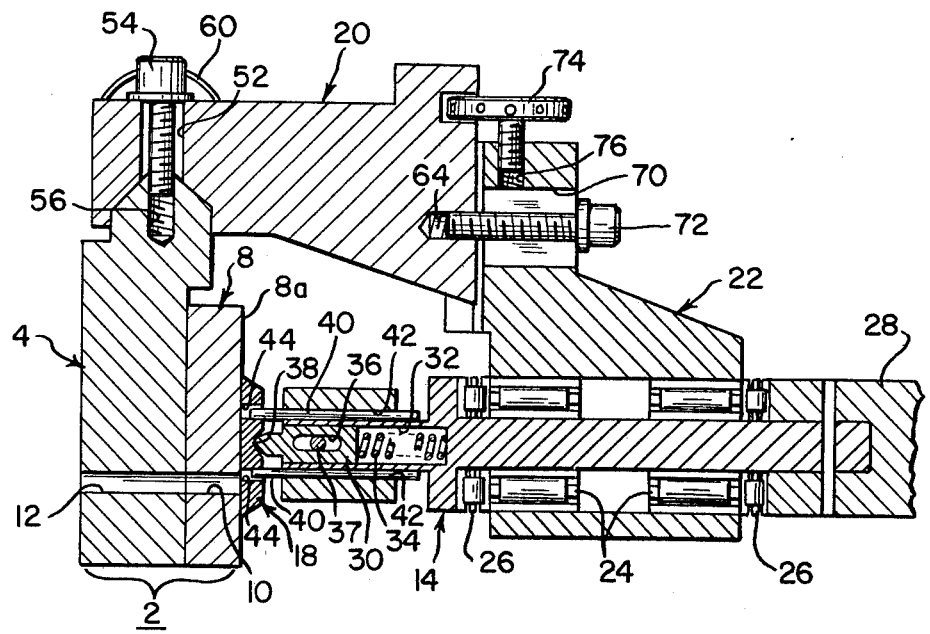
FIG. 3 is a cross-sectional view of the apparatus shown in FIG. 1.

Referring to FIGS. 1, 2 and 3, and extrusion block 2 in the illustrated embodiment consists of a support member 4 and a panel 8 secured to the front surface of the support member 4 by screws 6. The panel 8 has formed therein an extrusion opening 10 open at its surface 8a. Opening 10 communicates with an extrusion passage 12 in the support member 4. The surface 8a of the panel 8 of the extrusion block 2 is flat in a region including at least the area of the extrusion opening 10, so that a cutting blade for cutting plastic extruded through the extrusion opening 10 can be rotated on the flat surface across the open end of the extrusion opening. In the illustrated embodiment, the entire surface 8a of the panel 8 is formed with a flat surface.

The extrusion block 2 of the above construction which is known per se is secured to the front end of a suitable extruder (not shown); and thus, a molten plastic resin is conveyed from the extruder into the extrusion opening 10 via the extrusion passage 12. The plastic extruded from the extrusion opening 10 is cut by the plastic dispensing and cutting apparatus of the present invention, and dispensed to shells of container closures in the manner disclosed in the above-cited U.S. Pat. Nos. 3,360,827 and 4,060,053.

In accordance with the teachings of the present invention, the plastic dispensing and cutting apparatus for cutting the resin extruded from the extrusion opening 10 includes a rotating shaft 14 connected at its use and to an output shaft 16 of a drive mechanism, not shown, and a cutting tool 18 connected at the front end of the shaft 14.

The rotating shaft 14 is supported by needle bearings 24 and thrust bearings 26 (FIG. 3) on a support block 22 supported on the extrusion block 2 through an auxiliary block 20. The shaft is freely rotatable but held against movement in the axial direction. It is important that the rotating shaft 14 be disposed substantially perpendicular to the surface 8a of the extrusion block. To this end, the rear end of the rotating shaft 14 is connected to the output shaft 16 of the drive mechanism by a universal joint 28 known per se. The output shaft 16 of the drive mechanism is connected to a driving source (not shown) such as an electric motor through a suitable motion transmitting mechanism. It will be readily appreciated therefore that the rotating shaft 14 is rotated as prescribed by the actions of the drive mechanism including the drive source, the motion transmitting mechanism and the output shaft 16.

The front end of the rotating shaft 14 is defined by an end member 30 formed separately from the main body portion of the shaft 14 and fitted in the forward end of the main body portion. With reference to FIGS. 2 and 3, an opening 32 having a predetermined depth and extending rearwardly in the direction of the axis of rotation of the shaft 14 is formed in the forward end of its main body portion and the end member 30 is fitted in this opening. A spring 34 is interposed between the bottom surface of the opening 32 and the rear end of the end member 30. The end member 30 is thus urged resiliently toward the surface 8a of the extrusion block 2 by the elastic action of the spring 34. A slot 36 extending in the direction of the axial line is formed in the side surface of the end member 30, and a through-hole 35 extending across the opening 32 perpendicularly to the axis of rotation is formed in the main body portion 14. A pin 37 is inserted through the through-hole 35 and the slot 36. It will be clear therefore that by the cooperative action of the pin 37 and the slot 36, the movement of the end member 30 in the axial direction with respect to the rotating shaft 14 is restricted within a predetermined range.

The forward end of the end member 30 projecting from the forward end of the main body portion of the rotating shaft 14 defines the front end of the rotating shaft 14; and it abuts the back surface of the cutting tool 18. Accordingly, the aforesaid resilient action of the spring 34 is transmitted to the cutting tool through the end member 30 to press the cutting tool 18 resiliently against the surface 8a of the extrusion block 2. It is important that the front end of the rotating shaft 14 should abut the rotating center of the back surface of the cutting tool 18, and that the cutting tool 18 be adapted to tilt in any desired direction with respect to the axis of rotation of the rotating shaft 14. To achieve this end, in the illustrated embodiment shown in FIGS. 1 to 3, the forward tip of the end member 30 is tapered to a conical shape, and a recess 38 tapered in a conical shape is formed at the rotating center of the back surface of the cutting tool 18. The conical recess 38 has a larger angle of apex than the angle of apex of the conical tip of the member 30. Thus, the conical end of the end member 30 is fitted into the conical recess 38 of the cutting tool 18 for universal movement. A similar operation and result may be obtained by forming the forward tip of the end member 30 and the recess 38 of the cutting tool 18 in any desired pyramidal shape as in a polygonal pyramid such as a triangular or quadrangular pyramid instead of forming then in a conical shape.

Figure 4:
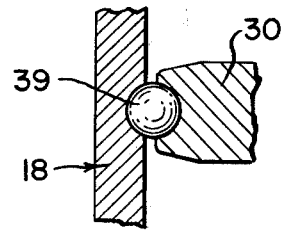
FIGS. 4, 5 and 6 are fragmentary sectional views of modified embodiments respectively showing the connection between the end of a rotating shaft and the rotating center on the back surface of a cutting tool.
Figure 5:
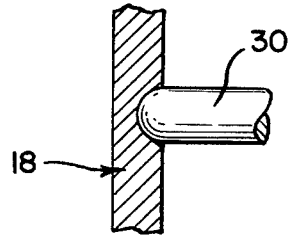
Figure 6:
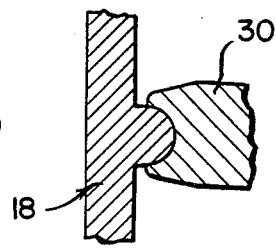

Instead of forming the forward tip of the end member in a pyramidal shape and providing a pyramidal recess 38 in the central rotating portion on the back side of the cutting tool 18, a similar operation and result may also be obtained by employing the modified constructions shown in FIGS. 4, 5 and 6. In the modified example shown in FIG. 4, a hemispherical recess is formed in both the forward tip of the end member 30 and in the rotating center on the back surface of the cutting tool 18, and a spherical body 39 is fitted partly in both.

In the modified example shown in FIG. 5, the forward tip of the end member 30 is formed in a hemispherical shape, and a hemispherical recess is formed in the rotating center on the back side of the cutting tool 18. In this structure, the hemispherical forward tip of the end member 30 is inserted in the hemispherical recess of the cutting tool 18. Clearance is provided to permit universal movement such as by chamfering the recess.

In the modified embodiment shown in FIG. 6, a hemispherical recess is formed in the forward tip of the end member 30, and a hemispherical projection is formed in the rotating center of the back side of the cutting tool. In this structure, the hemispherical projection of the cutting tool 18 is received by the hemispherical recess of the end member 30.

In the plastic dispensing and cutting apparatus in accordance with this invention, the cutting tool 18 is adapted to tilt in any desired direction with respect to the axis of rotation of the rotating shaft 14. It will be readily appreciated therefore that although the cutting tool 18 is urged resiliently against the surfce 8a of the extrusion opening block 2 by the elastic action of the spring 34, rotation is not transmitted from the front end of the rotating shaft 14 to the cutting tool 18. In accordance with the teachings of this invention, a separate drive means couples the shaft to the cutting tool. In particular, at least one drive pin 40 projects forwardly of the shaft 14 and engaged with the back surface of the cutting tool 18. The pin is secured to the shaft 14 for rotation therewith. Accordingly, rotation of the rotating shaft 14 is transmitted to the cutting tool 18.

In the embodiment shown in FIGS. 1, 2 and 3, two pin-fitting holes 42 extending in the direction of the axis of rotation of the shaft 14 are provided at as distance of 180 degrees from each other around the opening 32 at the forward end of the main body portion of the rotating shaft 14. A drive pin 40 is inserted into each of the two pin-fitting holes 42. The cutting tool 18 has formed therein pin-receiving holes 44 corresponding respectively to the positions of the two drive pins 40. The forward end portion of each of the drive pins 40 which projects beyond the front end of the rotating shaft 14 is inserted into each of the pin-receiving hole 44, thereby drivingly engaging the drive pins 40 with the cutting tool 18. In order that the insertion of the drive pins 40 into the pin-receiving holes 44 will not hamper the tilting of the cutting tool 18 in a desired direction, the inside diameter of each pin receiving hole 44 is slightly larger than the outside diameter of each drive pin 40.

In the illustrated embodiment, the pin-receiving holes 44 are provided in the cutting tool 18, and the forward end portions of the drive pins 40 are inserted into such pin-receiving holes 44. Alternatively, it is possible to merely bring the peripheral surface of the forward end portion of each drive pin 40 into contact with the side surface of the cutting tool 18, or with a suitable recess or abutment formed on the side surface of the cutting tool 18. Furthermore, in the illustrated embodiment, two drive pins 40 are used, but if desired, only one drive pin or three or more pins may be used. In view, however, of the need for transmitting the rotation of the rotating shaft 14 uniformly to the cutting tool 18, it is preferable to use two or more drive pins disposed symmetrically with respect to the axis of rotation of the rotating shaft 14.

At least one cutting blade is formed on the front surface of the cutting tool 18. In the embodiment shown in FIGS. 1 and 2, two blades 46 are provided on the cutting tool. The cutting edge of the cutting blade 46 is formed flat so as to lie in a flat plane. In the illustrated embodiment, not only the cutting edge but also the entire front surface of the cutting tool 18 are formed in the same flat plane. Accordingly, the entire cutting edge of the cutting blade 46 makes sufficiently good linear contact with the flat surface 8a of the block 2. Since in the illustrated embodiment the entire front surface of the cutting tool 18 is formed in the same flat plane, not only the cutting edges of the cutting blades 46 but also the entire front surface of the cutting tool 18 makes very good planar contact with the surface 8a of the block 2. Thus, the plastic extruded from the extrusion opening 10 in the surfce 8a of the block 2 is properly cut as prescribed. Furthermore, the cutting blades 46 do not undergo localized wear and their life becomes much longer than with conventional ones.

The construction of the auxiliary block 20 and the support block 22 used to support the rotating shaft 14 will now be described in detail. As most clearly illustrated in FIG. 2, a guide rail 48 extending substantially horizontally and substantially parallel to the surface 8 of the extrusion block 2 is formed on the top surface of the support member 4 for the extrusion block 2. The auxiliary block 20 has formed at its lower surface a receiving groove 50 having a shape corresponding to the shape of the guide rail 48. A slender through slot 52 extends along the receiving groove 50. As is understood from FIGS. 1 to 3, the auxiliary block 20 is mounted on the extrusion block 2 by engaging the receiving groove 50 with the guide rail 48 and by screwing a set screw 54 through the slot 52 into a screw hole 56 formed in the guide rail 48. Furthermore, a recess 58 is formed near one end of the guide rail 48, and in the recess 58 is rested the head of an adjusting screw 60. Screw 60 is screwed into a screw hole (not shown) formed in the side surface of the auxiliary block 20. Thus, when the screw 60 is turned to change the degree of its screwing into the screw hole, the auxiliary block 20 is moved along the guide rail 48. It will be apparent therefore that by manipulating the adjusting screw 60, the position of mounting of the auxiliary block 20 on the extrusion block 2 can be properly adjusted in the direction of the guide rail 48, i.e., in a direction substantially horizontal and substantially parallel to the surfce 8a of the extrusion block 2.

The support block 22 supporting the rotating shaft 14 is mounted on the auxiliary block 20 by the same mode of mounting as the mounting of the auxiliary block 20 on the block 2. In this way, its position may be adjusted freely in a direction substantially perpendicular to the adjustment of the block 20. As most clearly illustrated in FIG. 2, a guide rail 62 extending in a substantially perpendicular direction is formed in the end surface of the auxiliary block 20. A screw hole 64 and recess 66 are formed in the guide rail 62. The end surface of the support block 22 has formed therein a receiving groove 68 corresponding to the guide rail 62. A through slot 70 extends along the receiving groove 68. The support block 22 is mounted on the auxiliary block 20, as can be understood from FIGS. 1 to 3, by engaging the receiving groove 68 with the guide rail 62 and screwing a set screw 72 into the screw hole 64 via the through slot 70. The head of an adjusting screw 74 is rested in the recess 66, and its stem is screwed into a screw hole 76 formed on the top surface of the support block 22. Thus, by manipulating the adjusting screw 74, the position of mounting the support block 22 on the auxiliary block 20 can be adjusted properly in the direction of the guide rail 62.

The position of the rotating shaft 14 can therefore be properly adjusted in any direction parallel to the surface 8a of the extrusion block 2 by manipulating the adjusting screws 60 and 74 as required. This consequently makes it possible to adjust the position of the cutting tool 18 with respect to the surface 8a of the extrusion block 2, particularly with respect the extrusion opening 10 provided in the surface 8a.

We claim:

1. The improvement in a plastic dispensing device for cutting and dispensing charges of plastic material extruded from an extrusion opening provided in a flat surface of an extrusion block, said device including a rotatable shaft disposed substantially perpendicular to the surface of the extrusion block with its front end spaced from said surface in facing relation therewith, at least one cutting tool having at least one cutting blade interposed between the surface of the extrusion block and the front end of the shaft with the cutting blade disposed for movement across the extrusion opening in the flat surface of the extrusion block and a back surface of the cutting tool being engaged by the front end of the shaft, and spring means acting to hold the cutting tool resiliently against the flat surface, the improvement charcterized by:
   (a) the cutting blade of the cutting tool having at least one cutting edge disposed in a flat plane;
   (b) means for connecting the front end of the shaft to the back surface of the cutting tool for universal pivoting movement with respect thereto to hold the cutting edge of the cutting blade flat against the flat surface of the extrusion block; and
   (c) drive means connecting the rotatable shaft to the cutting tool to effect rotation of the cutting tool and movement of the cutting blade across the extrusion opening with the cutting edge lying flat against the flat surface of the extrusion block.

2. The improvement in the dispensing device according to claim 1, characterized in that:
   (a) the cutting tool has a front surface lying in said flat plane and engaging against the flat surface of the extrusion block; and
   (b) the front end of the rotatable shaft engages against the back surface of the cutting tool at a location aligned with the front surface thereof as measured in a direction perpendicular to said front surface.

3. The improvement in the dispensing device according to claim 2, characterized in that:
   (a) the means for connecting the front end of the rotatable shaft to the back surface of the cutting tool includes:
       (1) a tapered tip at the front end of the rotatable shaft engaging the back surface of the cutting tool.

4. The improvement in the dispensing device according to claim 2, characterized in that:
   (a) the means for connecting the front end of the rotatable shaft to the back surface of the cutting tool includes:
       (1) a tapered recess in the back surface of the cutting tool with a predetermined taper angle, and
       (2) a tapered tip at the front end of the rotatable shaft, said tapered tip having a taper angle less than said predeterminded taper angle and being rotatably seated within said recess.

5. The improvement in the dispensing device according to claim 2, characterized in that:
   (a) the means for connecting the front end of the rotatable shaft to the back surface of the cutting tool includes:
       (1) a conical or pyramidal recess in the back surface of the cutting tool with a predetermined apex angle, and
       (2) a conical or pyramidal tip at the front end of the rotatable shaft, said tip having an apex angle less than said predetermined apex angle and being rotatably seated within said recess.

6. The improvement in the dispensing device according to claim 2, charcterized in that:
   (a) the means for connecting the front end of the rotatable shaft to the back surface of the cutting tool includes:
       (1) a hemispherical recess in both the back surface of the cutting tool and the front end of the shaft, and
       (2) a spherical member partially disposed in each of the recesses.

7. The improvement in the dispensing device according to claim 2, characterized in that:
   (a) the means for connecting the front end of the rotatable shaft to the back surface of the cutting tool includes:
       (2) a hemispherical recess formed in the back surface of the cutting tool, and
       (2) a mating hemispherical tip at the front end of the shaft disposed within said recess.

8. The improvement in the dispensing device according to claim 2, characterized in that:
   (a) the means for connecting the front end of the rotatable shaft to the back surface of the cutting tool includes:
       (1) a hemispherical projection on the back surface of the cutting tool, and
       (2) a mating hemispherical recess at the front end of the shaft and disposed in mating relation with said projection.

9. The improvement in the dispensing device according to any one of claims 1–8, characterized in that:
   (a) said drive means includes:
       (1) at least one drive pin connected to said rotatable shaft for rotation therewith, said pin extending generally in the direction of said shaft at a location radially outwardly of the axis of rotation of the shaft and into loose engagement with said cutting tool to effect rotation thereof about said axis of rotation upon said shaft being rotated.

10. The improvement in the dispensing device according to any one of claims 1-8, characterized in that:
   (a) said rotatable shaft includes a main body member and separate end member slidably disposed in telescoping relation therein for limited axial movement, the separate end member defining the front end of the shaft; and
   (b) said spring means is interposed between said main body and end members of the shaft to resiliently urge the end member into engagement with the back surface of the cutting tool.

11. The improvement in the dispensing device according to claim 10, characterized in that:
   (a) the drive means includes at least one drive pin mounted in the body member of said rotatable shaft, said pin extending generally in the direction of said shaft; and
   (b) a pin receiving recess in the back surface of said cutting tool receiving said pin and having a size larger than the size of the pin so as not to interfere with the universal pivoting connection of the rotatable shaft and cutting tool.

12. The improvement in the dispensing device according to claim 11, characterized in that:
   (a) a plurality of drive pins are mounted in the body member of the shaft symmetrically with respect to the axis of rotation of the rotatable shaft.

13. The improvement in the dispensing device according to any one of claims 1-8, characterized in that:
   (a) slide means for mounting said shaft and cutting tool for lateral movement across the flat surface of the extrusion block.

14. The improvement in the dispensing device according to claim 13, characterized in that:
   (a) said slide means includes first and second slides, the first slide being mounted on said extrusion block for lateral movement in one direction and the second slide being mounted on the first slide for lateral movement in a direction perpendicular to the one direction.

* * * * *